United States Patent [19]
Ali et al.

[11] Patent Number: 6,075,850
[45] Date of Patent: Jun. 13, 2000

[54] FLASH-HOOK CALLER ID

[75] Inventors: Syed S. Ali, Allentown; Charles William Berthoud, Nazareth; James J. Greybush, Allentown, all of Pa.

[73] Assignee: Lucent Technologies Inc., Murray Hill, N.J.

[21] Appl. No.: 09/167,344

[22] Filed: Oct. 7, 1998

[51] Int. Cl.[7] ............................ H04M 1/56; H04M 15/06
[52] U.S. Cl. ............................................ 379/142; 379/215
[58] Field of Search ..................................... 379/142, 215

[56]            References Cited

U.S. PATENT DOCUMENTS

| | | | |
|---|---|---|---|
| 5,583,924 | 12/1996 | Lewis | 379/142 |
| 5,619,561 | 4/1997 | Reese | 379/142 |
| 5,636,269 | 6/1997 | Eisdorfer | 379/215 |
| 5,680,447 | 10/1997 | Diamond et al. | 379/215 |
| 5,825,867 | 10/1998 | Epler et al. | 379/215 |
| 5,836,009 | 11/1998 | Diamond et al. | 379/93.23 |
| 5,943,407 | 8/1999 | Davis et al. | 379/142 |
| 5,946,384 | 8/1999 | Yee et al. | 379/215 |
| 5,970,128 | 10/1999 | Kim | 379/142 |

*Primary Examiner*—Paul Loomis
*Assistant Examiner*—Quoc D. Tran
*Attorney, Agent, or Firm*—John P. Veschi

[57]              ABSTRACT

In one embodiment according to the invention, a method is provided for handling a flash-hook signal from a telephone engaged in a first telephone call with a first distant party when a second telephone call with a second distant party is in a hold status. The method includes the steps of placing the first telephone call with the first distant party in the hold status, connecting the second telephone call, and providing a Caller ID indication to the telephone. In an alternative embodiment, a telephone according to the invention includes a flash-hook, and a Caller ID display. The telephone is adapted to display Caller ID data associated with a first call, and to be updated upon connection of a second call, in response to activation of the flash-hook, to display Caller ID data associated with the second call.

17 Claims, 2 Drawing Sheets

FLASH-HOOK CALLER ID

CROSS-REFERENCE TO RELATED APPLICATIONS:

This application is related to U.S. application Ser. No. 09/167,330, entitled Call Waiting Response Status, co-filed herewith and incorporated herein by reference.

FIELD OF THE INVENTION

The invention is related to the field of telephony, and in particular to the provision of call related data, such as Caller ID data.

BACKGROUND OF THE INVENTION

Caller ID is a service provided by a telephone service provider that provides a user with information regarding an incoming call. Typically, a display associated with a user's telephone, either integrated into the telephone or as part of an adjunct box coupled to the telephone, will display the telephone number and/or name associated with an incoming call. In Type I Caller ID, which occurs when the user's telephone is in an on-hook state (i.e., the user is not already engaged in a telephone call while the incoming call is arriving), the Caller ID data is provided by a central office of the service provider as frequency shift keying (FSK) data between the first and second rings. The user, after the first ring, can thus look at the display to decide, based on the displayed information, whether to answer an incoming telephone call.

In Type II Caller ID, also known as Caller ID with Call Waiting (CID/CW), the user's telephone is in an off-hook state (i.e., already engaged in a telephone call while the incoming call is arriving). In addition to the familiar audible tone, known as a Subscriber Alert Signal ("SAS tone"), that alerts a user to an incoming call waiting telephone call, the central office provides a Caller ID Alert Signal ("CAS tone") to inform the user's telephone equipment that Caller ID data is about to be transmitted, pending receipt of an acknowledgment from the user's telephone equipment. Based on the CAS tone, the user's telephone briefly mutes its transducers (i.e., microphone and speaker) so that the FSK data is not heard by the user or corrupted by the user's speech. The muting period is sufficiently brief that it does not appreciably disrupt the voice communication between the parties to the conversation. The user, after hearing the SAS tone, can then view the display to determine whether to flash-hook over to the incoming call and temporarily place the existing call into a hold status. The flash-hook operation is accomplished by briefly pressing or activating a switch-hook button, which is normally in a first position, such as down, when the telephone is on-hook, and in a second position, such as up, when the telephone is off-hook, to alert the central office to the desire to switch to the incoming call.

When a telephone is equipped to receive Type II Caller ID data, a user who elects to flash-hook to an incoming call, based, for example, on viewing the Caller ID data associated with the incoming call, may subsequently decide to switch back to the original call and temporarily place the newer call in a hold status, and can do so by again activating the switch-hook. The user can switch back and forth between the two calls as often as desired. However, activation of the switch-hook does not automatically result in a flash-hook operation. Frequently, the flash-hook operation does not occur, and the user thus must verbally confirm the identity of the distant party when switching between calls. There is a need, therefore, for a device and process for automatically providing the user with the identity of the presently-connected caller.

SUMMARY OF THE INVENTION

In one embodiment according to the invention, a method is provided for handling a flash-hook signal from a telephone engaged in a first telephone call with a first distant party when a second telephone call with a second distant party is in a hold status. The method includes the steps of placing the first telephone call with the first distant party in the hold status, connecting the second telephone call, and providing a Caller ID indication to the telephone.

In an alternative embodiment, a telephone according to the invention includes a flash-hook, and a Caller ID display. The telephone is adapted to display Caller ID data associated with a first call, and to be updated upon connection of a second call, in response to activation of the flash-hook, to display Caller ID data associated with the second call.

BRIEF DESCRIPTION OF THE DRAWING

The advantages of the invention will be apparent to one of ordinary skill upon review of the following description in light of the following figures, wherein.

DETAILED DESCRIPTION

Figure 1:
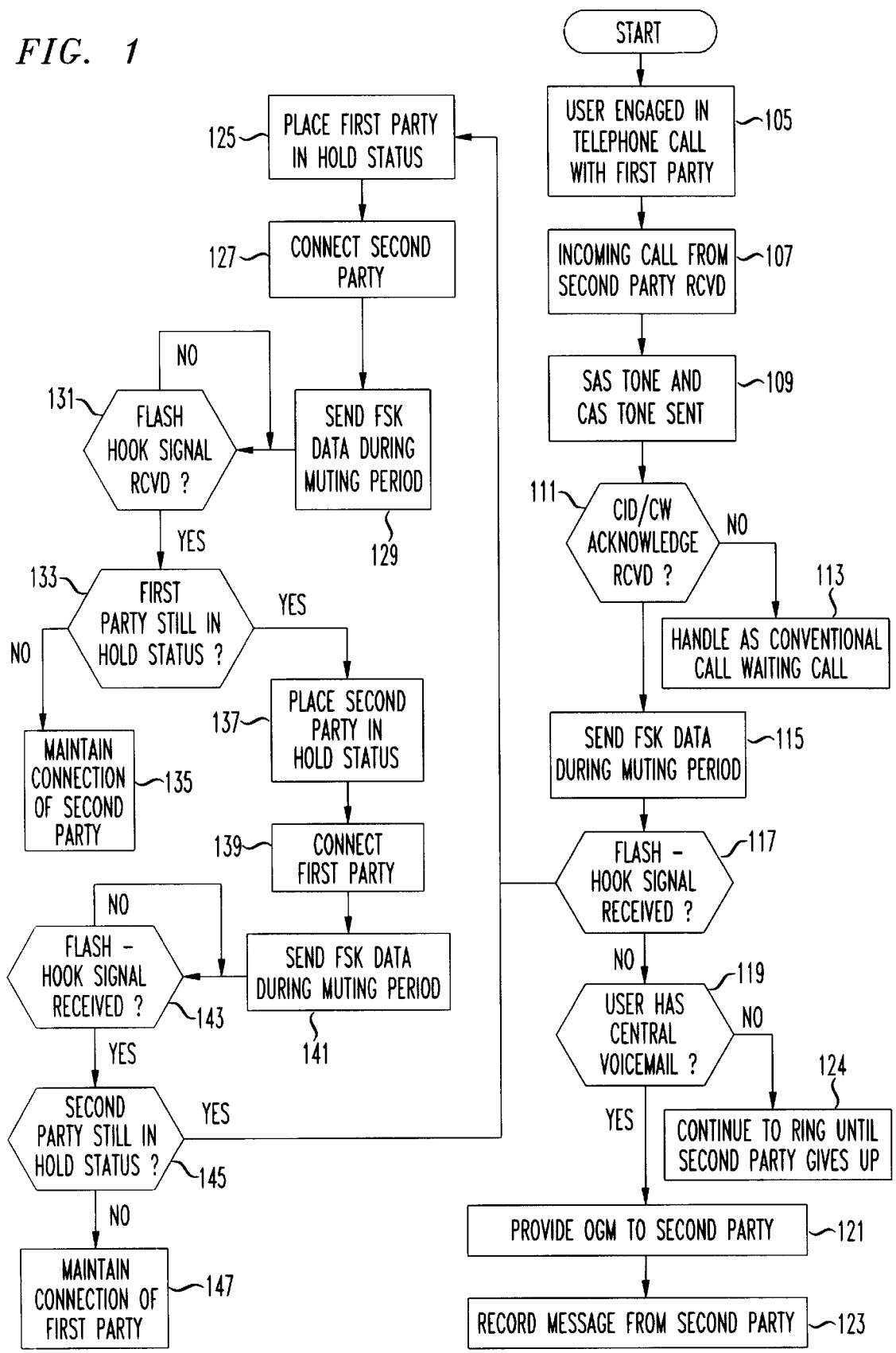
FIG. 1 is a flowchart showing exemplary operation of a central office of a telephone service provider according to the invention.

FIG. 1 is a flowchart showing the operation of a central office of a telephone service provider according to the invention. In step 105, the user is engaged in a first telephone call with a first party. In step 107, the central office receives a call for the user from the second party, and responds by sending, in step 109, a SAS tone and a CAS tone. In step 111, the central office determines if a CID/CW acknowledge signal is received from the user's telephone in response to the CAS tone. If the acknowledge is not received, the central office handles the call from the second caller as a conventional call waiting call at step 113. If, on the other hand, the acknowledge signal is received at step 111, then at step 115 the central office sends FSK Caller ID data during a muting period and waits for a flash-hook indication from the user's telephone.

If, at step 117, the flash-hook indication is not received, the central office may check, at step 119, to determine if the user has a central voicemail service, in which case, at step 121 an outgoing greeting message will be provided, and at step 123 a message from the second party will be recorded. If the central office does not check for the central voicemail service, for example, because the central office does not offer this service, or if the response at step 119 is NO, then the central office can merely continue to ring (i.e., continue to send SAS clicks to the user's telephone and continue to provide a ringing indication to the second party) until the second party gives up and returns to an on-hook state at step 124

If, on the other hand, at step 117 the flash-hook signal is received, then the central office, at step 125, places the first party into the hold status, at step 127 connects the second party to the user's telephone, and at step 129 sends data, such as FSK data, during a muting period. The data sent in step 129 may be Caller ID data associated with the second party. Alternatively, the data may inform the user's telephone about the new connection, so that the user's telephone can update a display. For example, the user's telephone can change the display from showing data related to the first party, to showing data related to the second party which was received, for example, at step 115 and stored in a memory location within the user's telephone.

The ordering of the aforementioned steps is somewhat arbitrary. For example, the data sent at step 129 may occur before the first party is placed in the hold status in step 125, or before the second party is connected at step 127, or in parallel with either or both of steps 125 and 127.

After the steps 125–129, the central office maintains the connection of the second party and waits for a flash-hook signal from the user's telephone at step 131. When the flash-hook signal is received, the central office, at step 133, checks to see if the first party is still in the hold status. In other words, the central office checks to see if the first party hung up while in the hold status, or is still waiting to be reconnected to the user. Of course, if the determination at step 133 is that the first party has already hung up, this information can be already known by the central office prior to step 131. Thus, the ordering of steps 131 and 133 is purely exemplary, and provided merely to demonstrate that the central office will account for the status of the party previously placed in the hold status when the central office receives a flash-hook signal at step 131.

If, at step 133, the answer is that the first party is not still in the hold status, then at step 135 the central office will maintain the connection of the second party. If, on the other hand, the first party is still in the hold status, then the central office proceeds to step 137, where it places the second party into the hold status, step 139 where it connects the first party, and step 141, where it sends data, such as FSK data, regarding the first party, to the user during a mute period. As described earlier with respect to steps 125–129, the ordering of steps 137–141 is presented in an exemplary manner. The data may include Caller ID data, or may simply alert the user's telephone to update a display associated therewith to indicate that the first party is now the connected party.

After the steps 137–141, the central office maintains the connection of the first party and waits for a flash-hook signal from the user's telephone at step 143. When the flash-hook signal is received, the central office, at step 145, checks to see if the second party is still in the hold status. Of course, as described earlier with respect to step 133, if the second party has already hung up, this information can be already known by the central office prior to step 135, and the ordering of steps 143 and 145 is therefore also exemplary to demonstrate that the central office will account for the status of the party previously placed in the hold status when the central office receives a flash-hook signal at step 143.

If the second party is not in the hold status, the central office proceeds to step 147, where it maintains the connection of the first party. If, on the other hand, the second party is still in the hold status, the central office returns to steps 125-129, where it places the first party in the hold status, connects the second party, and provides data, preferably during a muting period, to the user's telephone, relating to the connection of the second party. The process according to the invention can thus continue, with the user switching back and forth between the first party and the second party, until the parties complete their discussions and hang up.

The data provided from the central office to the user's telephone can be, as discussed above, FSK data sent during a muting period. Of course, other forms of data may be sent, either in band or out of band, and the data need not be sent during a muting period. If the data is sent during a muting period, the muting period may be set, for example, with respect to the flash-hook signal, such as a predetermined period of time after the flash-hook signal. Alternatively, a tone, such as a CAS tone, may be provided to alert the user's telephone with information regarding the muting period, such as informing the user's telephone of the time of the muting period.

Figure 2:
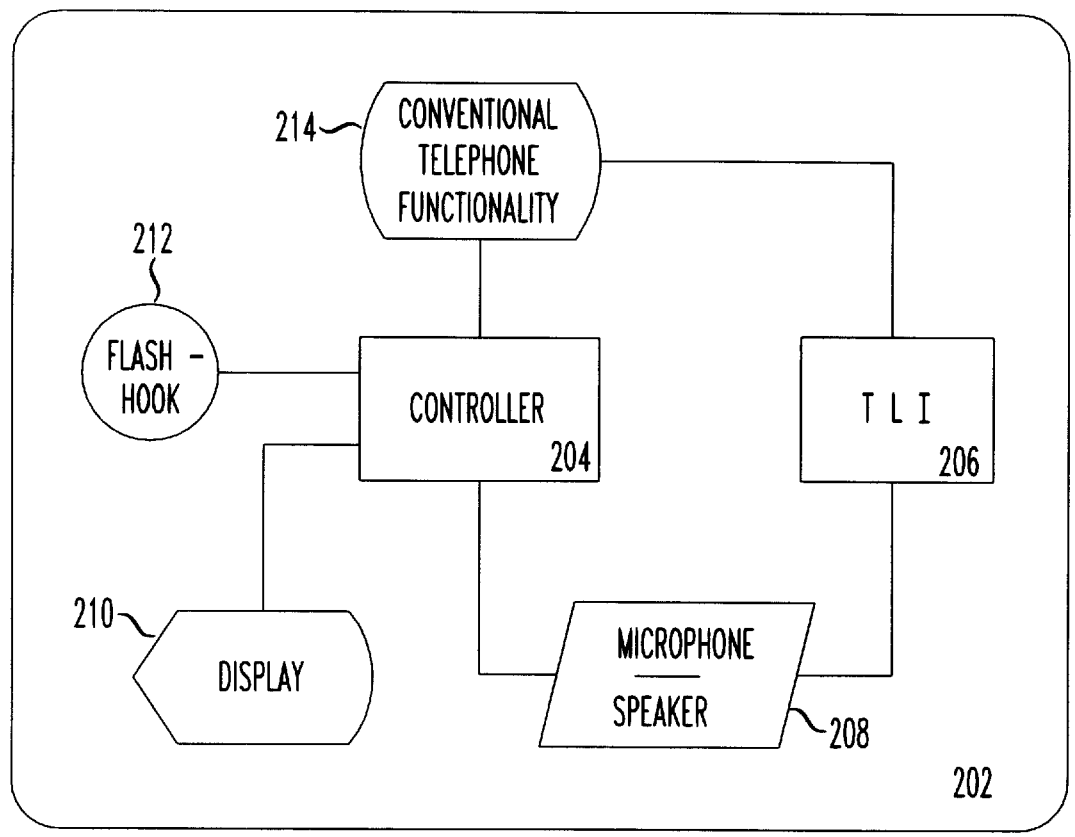
FIG. 2 is a simplified block diagram of an example of a telephone according to the invention.

A simplified block diagram of an example of the user's telephone according to the invention, 202, is shown in FIG. 2. Telephone 202 includes a controller 204, a telephone line interface (TLI) 206, a microphone/speaker unit 208, a display 210, a flash-hook 212 and additional conventional telephone functionality 214. In one embodiment according to the invention, the data from the central office is received by the controller 204 via the TLI 206, and the controller 204 adjusts display 210 based on this data. For example, the data can include Caller ID data, and the controller can instruct the display to show the Caller ID data.

Figure 3:
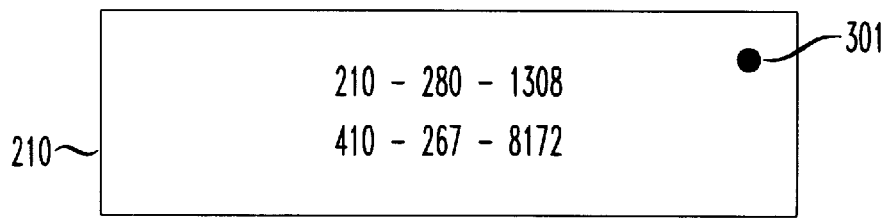
FIG. 3 is an exemplary display of a telephone in one embodiment according to the invention.

In an alternative example, as depicted in FIG. 3, display 210 includes space for two sets of Caller ID data, such as two telephone numbers. In this example, a first set of Caller ID data, including a first telephone number, exemplarily illustrated as 201-280-1308, is associated with the first party, and a second telephone number, exemplarily illustrated as 410-267-8172, is associated with the second party. Display 210 also includes an indicator, such as dot 301, that indicates to the user which of the two telephone numbers is currently connected, the other telephone number corresponding to a party in the hold status. Thus, as the user switches between callers, the indicator moves back and forth between the two portions of display 210. The data displayed, of course, can include the name of the party or any other data related to the party, in addition to or in place of the telephone number.

As described above, the display 210 of telephone 202 is adjusted based on information received from the central office. It is also possible for the display to be updated based solely on information resident in telephone 202, such as in a memory associated with controller 204, based on instructions stored in controller 204. For example, upon sensing activation of the flash-hook, controller 204 can update display 210, by providing an instruction to display 210, to change the data shown thereon or to move an indicator such as dot 301. Since it sometimes occurs that a flash-hook activation is not received or properly acted upon by the central office, the controller 204 can receive confirmation from the central office that the switch between parties has in fact occurred, and further update the display 210 based on this confirmation, or the failure to receive such a confirmation. For example, when the flash-hook is activated, the controller can cause display 210 to display a dot next to each set of Caller ID data, with the dot associated with the new party, i.e., the party that was on hold, flashing periodically, until the confirmation is received, at which time the dot associated with the new party is held constant and the dot associated with the old party is extinguished.

The controller 204 can be an integrated circuit, such as a microcontroller or a digital signal processor. The use of a switch-hook of the user's telephone to initiate the flash-hook signal is purely by way of example. Telephone 202 can be configured so that the flash-hook signal is initiated in various ways, such as, for example, activating a special purpose key that exists solely to create the flash-hook signal, or activating particular keys on the telephone keypad. Further, the flash-hook signal may take any form, such as the conventional switch-hook signal used for conventional call waiting, or any other in band or out of band signal.

Various illustrative embodiments according to the invention having been described, it should not be construed that the invention is limited to these particular embodiments. Various changes and modifications may be effected by one skilled in the art without departing from the spirit or scope of the invention as defined in the appended claims.

We claim:

1. A method of handling a flash-hook signal from a telephone engaged in a first telephone call with a first distant party when a second telephone call with a second distant party is in a hold status, comprising the steps of:

placing the first telephone call with the first distant party in the hold status;

connecting the second telephone call; and providing a Caller ID indication to the telephone.

2. A method as recited in claim 1, wherein the Caller ID indication is Caller ID data associated with the second distant party.

3. A method as recited in claim 1, wherein the Caller ID indication alerts the telephone that the flash-hook successfully resulted in a switch to the second telephone call.

4. A method as recited in claim 1, wherein the steps of placing, connecting and providing are accomplished at a central office of a telephone service provider.

5. A method as recited in claim 2, wherein the step of providing the Caller ID data occurs during a muting period of the telephone.

6. A method as recited in claim 5, wherein the muting period is related to the flash-hook signal.

7. A method as recited in claim 6, wherein the muting period is a predetermined period of time after the flash-hook signal.

8. A method as recited in claim 5, further comprising the step of providing an alert signal to provide the telephone with information regarding the muting period.

9. A method as recited in claim 2, wherein the Caller ID data is FSK data.

10. A telephone, comprising:

a flash-hook; and a Caller ID display adapted to display Caller ID data associated with a first call, and to be updated upon connection of a second call, in response to activation of the flash-hook, to display Caller ID data associated with the second call.

11. A telephone as recited in claim 10, further comprising a memory adapted to store the Caller ID data associated with the second call, and to provide the Caller ID data to the Caller ID display.

12. A telephone as recited in claim 11, wherein the memory provides the Caller ID data associated with the second call in response to the activation of the flash-hook.

13. A telephone as recited in claim 11, wherein the memory is adapted to receive a signal issued by a central office of a telephone service provider, the memory providing the Caller ID data associated with the second call in response to the signal.

14. A telephone as recited in claim 11, wherein the memory is further adapted to store the Caller ID data associated with the first call, and to provide the Caller ID data associated with the first and second call to the Caller ID display.

15. A telephone as recited in claim 10, wherein the Caller ID display is adapted to display both the Caller ID data associated with the first call and the Caller ID data associated with the second call.

16. A telephone as recited in claim 15, wherein the Caller ID display is further adapted to provide an indicia of a presently connected call between the first call and the second call.

17. A telephone as recited in claim 10, adapted to receive the Caller ID data associated with the second call from a central office of a telephone service provider in association with activation of the flash-hook.

* * * * *